(12) United States Patent
Mori

(10) Patent No.: US 7,789,954 B2
(45) Date of Patent: Sep. 7, 2010

(54) WATER-BASED FLUORESCENT INK COMPOSITION

(75) Inventor: Shuhei Mori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/427,097

(22) Filed: Apr. 21, 2009

(65) Prior Publication Data

US 2009/0260540 A1   Oct. 22, 2009

(30) Foreign Application Priority Data

Apr. 21, 2008   (JP) ............................. 2008-110277

(51) Int. Cl.
*C09D 11/02* (2006.01)

(52) U.S. Cl. ................ 106/31.32; 106/31.58

(58) Field of Classification Search ............. 106/31.32, 106/31.58
See application file for complete search history.

(56) References Cited

U.S. PATENT DOCUMENTS

| | | | |
|---|---|---|---|
| 5,743,945 A * | 4/1998 | Yamashita et al. ....... | 106/31.58 |
| 6,508,871 B1 * | 1/2003 | Kato et al. ................ | 106/31.27 |
| 6,835,239 B2 * | 12/2004 | Hakamada et al. ....... | 106/31.32 |
| 7,144,449 B2 * | 12/2006 | Udagawa et al. ......... | 106/31.15 |
| 7,220,301 B2 * | 5/2007 | Nagashima et al. ...... | 106/31.32 |
| 7,429,291 B2 * | 9/2008 | Udagawa et al. ......... | 106/31.15 |
| 7,540,911 B2 * | 6/2009 | Sao et al. .................. | 106/31.58 |
| 2008/0220168 A1 * | 9/2008 | Sao et al. .................... | 427/256 |
| 2009/0047484 A1 * | 2/2009 | Kitamura et al. ......... | 428/195.1 |

FOREIGN PATENT DOCUMENTS

| | | |
|---|---|---|
| JP | 09-291246 | 11/1997 |
| JP | 2006-131667 | 5/2006 |

* cited by examiner

*Primary Examiner*—Jerry Lorengo
*Assistant Examiner*—Veronica Faison Gee
(74) *Attorney, Agent, or Firm*—Nutter McClennen & Fish LLP; John J. Penny, Jr.

(57) ABSTRACT

An ink composition includes C.I. Acid Red 52, C.I. Acid Red 92, C.I. Direct Yellow 87, water, a water-soluble organic solvent, tetraethylene glycol monoethylhexyl ether, and triethylene glycol monobutyl ether.

14 Claims, No Drawings

WATER-BASED FLUORESCENT INK COMPOSITION

BACKGROUND

1. Technical Field

The present invention relates to an ink composition that contains a fluorescent dye and an ink jet printing method using the ink composition.

2. Related Art

Red fluorescent inks have been used in printers for affixing a mark to metered mail. In particular, in North America, the United States Postal Service have designated red fluorescent inks that can be read with automatic reading apparatuses as inks to be used to affix a mark to metered mail.

Automatic reading apparatuses not only read bar codes, but also simultaneously identify the front side or the back side of metered mail. Red fluorescent inks. therefore must have high fluorescence intensity to reduce errors in identifying the front side or the back side of metered mail, as well as high optical density to improve the accuracy with which bar codes are read.

JP-A-9-291246 discloses a water-resistant red fluorescent ink for metered mail, which contains a glycol ether as a co-solvent penetrant.

JP-A-2006-131667 discloses a water-based fluorescent ink having excellent fluorescent color developability, which includes an aqueous fluorescent coloring dye containing C.I. Acid Red 52 and C.I. Acid Red 92 and a pigment dispersion containing C.I. Pigment Red 122.

The present inventors have found that the addition of a yellow dye C.I. Direct Yellow 87, tetraethylene glycol monoethylhexyl ether, and triethylene glycol monobutyl ether to a red fluorescent ink composition containing C.I. Acid Red 52 and C.I. Acid Red 92 can improve the fluorescence intensity and the color developability (optical density) of the red fluorescent ink composition. The invention is based on this finding.

SUMMARY

An advantage of some aspects of the invention is that it provides an ink composition that can provide printed matters having high fluorescence intensity, for example, to allow the identification of the front side or the back side of postal matters and excellent color developability, for example, to allow reading of bar code information.

An ink composition according to one aspect of the invention includes C.I. Acid Red 52, C.I. Acid Red 92, C.I. Direct Yellow 87, water, a water-soluble organic solvent, tetraethylene glycol monoethylhexyl ether, and triethylene glycol monobutyl ether.

An ink jet printing method according to another aspect of the invention is a method for ejecting droplets of the ink composition described above, allowing the droplets to adhere to a recording medium to print letters and symbols.

The invention can provide an ink composition that can provide printed matters having high fluorescence intensity, for example, to allow the identification of the front side or the back side of postal matters and excellent color developability, for example, to allow reading of bar code information.

DESCRIPTION OF EXEMPLARY EMBODIMENTS

Fluorescent Dye

An ink composition according to an aspect of the invention contains C.I. Acid Red 52, C.I. Acid Red 92, and C.I. Direct Yellow 87 as fluorescent dyes.

While the contents of the fluorescent dyes are not limited to particular values, preferably, the content of C.I. Direct Yellow 87 ranges from 3.2% to 4.8% by weight, the content of C.I. Acid Red 52 ranges from 0.05% to 0.20% by weight, and the content of C.I. Acid Red 92 ranges from 0.5% to 1.2% by weight. More preferably, the content of C.I. Direct Yellow 87 ranges from 3.7% to 4.3% by weight, the content of C.I. Acid Red 52 ranges from 0.08% to 0.17% by weight, and the content of C.I. Acid Red 92 ranges from 0.7% to 1.2% by weight. While the weight ratio of C.I. Acid Red 52 to C.I. Acid Red 92 is not limited to a particular value, the weight ratio preferably ranges from 1:4 to 1:12 and more preferably ranges from 1:8 to 1:11. At a weight ratio in the range of 1:4 to 1:12, the fluorescent ink composition can have higher fluorescence intensity and better color developability.

An ink composition according to an aspect of the invention contains, as a main solvent, water, preferably pure water or ultrapure water, such as ion-exchanged water, ultrafiltered water, reverse osmosis water, or distilled water. Preferably, water is sterilized by ultraviolet irradiation or the addition of hydrogen peroxide to prevent the generation of mold or bacteria, allowing the storage of the ink composition for a long period.

An ink composition according to an aspect of the invention contains a water-soluble organic solvent. Preferred examples of the water-soluble organic solvent include low-boiling organic solvents, such as methanol, ethanol, n-propyl alcohol, iso-propyl alcohol, n-butanol, sec-butanol, tert-butanol, iso-butanol, and n-pentanol. More preferably, the water-soluble organic solvent is a monohydric alcohol. A low-boiling organic solvent can reduce the drying time of ink. The content of a low-boiling organic solvent preferably ranges from 0.1% to 30% by weight and more preferably ranges from 5% to 10% by weight of the ink composition.

An ink composition according to a preferred aspect of the invention further contains a wetting agent composed of one or at least two high-boiling organic solvents. Preferred examples of the high-boiling organic solvent include polyhydric alcohols, such as ethylene glycol, diethylene glycol, triethylene glycol, polyethylene glycol, polypropylene glycol, propylene glycol, butylene glycol, 1,2,6-hexane triol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, diethylene glycol monoisobutyl ether, diethylene glycol monohexyl ether, triethylene glycol monomethyl ether, triethylene glycol monoethyl ether, triethylene glycol monobutyl ether, hexaethylene glycol monoethylhexyl ether (Newcol 1006 manufactured by Nippon Nyukazai Co., Ltd.), and tetraethylene glycol monoethylhexyl ether (Newcol 1004 manufactured by Nippon Nyukazai Co., Ltd.); urea; 2-pyrrolidone; N-methyl-2-pyrrolidone; and 1,3-dimethyl-2-imidazolidinone. Preferably, the high-boiling organic solvent is an alkyl ether of a polyhydric alcohol.

Preferred examples of the alkyl ether of a polyhydric alcohol include triethylene glycol monobutyl ether, diethylene glycol monobutyl ether, triethylene glycol monomethyl ether, diethylene glycol monoisobutyl ether, diethylene glycol monohexyl ether, hexaethylene glycol monoethylhexyl ether, and tetraethylene glycol monoethylhexyl ether. These alkyl ethers of polyhydric alcohols may be used alone or in combination. More preferred examples of the alkyl ether of a polyhydric alcohol include a combination of hexaethylene glycol monoethylhexyl ether and triethylene glycol monobutyl ether and a combination of tetraethylene glycol monoethylhexyl ether and triethylene glycol monobutyl ether. A combination of alkyl ethers of polyhydric alcohols can improve the permeability and the stability under a high-temperature environment of the ink composition. The ratio of alkyl ethers of polyhydric alcohols in the combinations described above is preferably, but not limited to, in the range of 1:1 to 1:3.

The content of the high-boiling organic solvent preferably ranges from 0.5% to 15% by weight and more preferably ranges from 1% to 10% by weight. Within these ranges, the fluorescent ink composition can have higher fluorescence intensity and better color developability. Preferably, the total content of tetraethylene glycol monoethylhexyl ether and triethylene glycol monobutyl ether ranges from 1% to 6% by weight of the ink composition, and the total content of hexaethylene glycol monoethylhexyl ether and triethylene glycol monobutyl ether ranges from 1% to 10% by weight of the ink composition.

An ink composition according to a preferred aspect of the invention further contains a saccharide, a tertiary amine, an alkali hydroxide, or ammonia. These additives can prevent coagulation of coloring materials and an increase in viscosity of the ink composition during long-term storage. With these additives, the ink composition can maintain flowability and redispersibility for a long period of time even when the ink composition is left alone in the air at room temperature. Furthermore, with these additives, the ink composition can have high ejection stability without causing nozzle clogging during printing or when restarting after the discontinuation of printing.

Examples of the saccharide include monosaccharides, disaccharides, oligosaccharides (including trisaccharides and tetrasaccharides), and polysaccharides, and preferably include glucose, mannose, fructose, ribose, xylose, arabinose, galactose, aldonic acid, glucitol, sorbitol, maltose, cellobiose, lactose, sucrose, trehalose, and maltotriose. The term "polysaccharides", as used herein, broadly means saccharides widely occurring in nature, such as alginic acid, α-cyclodextrin, and cellulose. Examples of the saccharide also include saccharide derivatives, such as reduced saccharides, for example, sugar alcohols having a general formula of $HOCH_2(CHOH)_nCH_2OH$ (wherein n is an integer in the range of 2 to 5), oxidized saccharides (for example, aldonic acid and uronic acid), amino acids, and thiosugars. Sugar alcohols, such as maltitol and sorbitol, are more preferred.

The content of the saccharide in the ink composition ranges from 0.1% to 40% by weight, preferably from 1% to 30% by weight.

Examples of the tertiary amine include trimethylamine, triethylamine, triethanolamine, dimethylethanolamine, diethylethanolamine, triisopropenolamine, and butyldiethanolamine. These tertiary amines may be used alone or in combination. The content of the tertiary amine in the ink composition ranges from 0.1% to 10% by weight, preferably from 0.5% to 5% by weight.

Examples of the alkali hydroxide include potassium hydroxide, sodium hydroxide, and lithium hydroxide. The content of the alkali hydroxide in the ink composition ranges from 0.01% to 5% by weight, preferably from 0.05% to 3% by weight.

An ink composition according to an aspect of the invention may further contain a surfactant. Examples of the surfactant include anionic surfactants, such as sodium dodecylbenzenesulfonate, sodium laurate, and ammonium salts of polyoxyethylene alkyl ether sulfates; nonionic surfactants, such as polyoxyethylene alkyl ethers, polyoxyethylene alkyl esters, polyoxyethylene sorbitan fatty acid esters, polyoxyethylene alkylphenyl ethers, polyoxyethylene alkylamines, and polyoxyethylene alkylamides; and acetylene glycols, such as Olefin Y, Surfynol 82, 104, 440, 465, and 485 (manufactured by Air Products and Chemicals Inc.), and Olfin PD002W (manufactured by Nissin Chemical Industry Co., Ltd.). These surfactants may be used alone or in combination. Preferably, the surfactant is Olfin PD002W.

An ink composition according to an aspect of the invention may further contain a pH adjusting agent, a preservative, a fungicide, and/or a phosphite antioxidant, if necessary. Preferred examples of the preservative include Proxel CRL, Proxel BDN, Proxel GXL, Proxel XL-2, Proxel IB, and Proxel TN.

Ink Jet Printing Method

In an ink jet printing method using an ink composition according to an aspect of the invention, droplets of the ink composition adhere to a hot recording medium, forming letters and symbols. For example, when an electrostrictive element converts electric signals into mechanical signals, ink stored in a nozzle head is intermittently ejected onto a recording medium to print letters and symbols. Alternatively, ink stored in a nozzle head is rapidly heated to foam at a position immediately in front of an ejection opening. Owing to the volume expansion of the ink caused by foaming, the ink is intermittently ejected onto a recording medium to print letters and symbols. An ink set that contains an ink composition according to a preferred aspect of the invention is preferably used in an ink jet printing method using an electrostrictive element. Preferably, droplets of an ink composition are ejected from a print head that ejects ink droplets by the mechanical action of a piezoelectric element.

A printed matter printed with an ink composition according to an aspect of the invention on a recording medium has an image having high fluorescence intensity and excellent color developability.

Examples of the recording medium include envelopes, ink jet papers (such as matte papers and glossy papers), plain papers, actual printing papers, and films. Among others, envelopes are preferred.

EXAMPLES

The invention may be more fully understood from the following examples, which are offered by way of illustration and not by way of limitation.

Preparation of Ink Composition

Components shown in Tables 1 to 5 were mixed and filtered through a 10-μm membrane filter to prepare inks. Values in the tables are the contents of the components in the inks (% by weight). TEG-mBE denotes triethylene glycol monobutyl ether, DEG-mBE denotes diethylene glycol monobutyl ether, TEG-mME denotes triethylene glycol monomethyl ether, DEG-miBE denotes diethylene glycol monoisobutyl ether, DEG-mHeE denotes diethylene glycol monohexyl ether, N1006 denotes hexaethylene glycol monoethylhexyl ether, N1004 denotes tetraethylene glycol monoethylhexyl ether, and 10% PD002W/90% TEG-mBEa mixture denotes a mixture of 10% by weight of Olfin PD002W (manufactured by Nissin Chemical Industry Co., Ltd.) and 90% by weight of diethylene glycol monobutyl ether.

TABLE 1

| | Sample No. | | | | |
|---|---|---|---|---|---|
| | 1 | 2 | 3 | 4 | 5 |
| C.I. Acid Red 52 | 0.09 | 0.09 | 0.09 | 0.09 | 0.09 |
| C.I. Acid Red 92 | 0.87 | 0.87 | 0.87 | 0.87 | 0.87 |
| C.I. Direct Yellow 87 | — | 2.0 | 4.0 | 4.5 | 5.0 |
| TEG-mBE | 8.5 | 8.5 | 8.5 | 8.5 | 8.5 |
| Glycerin | 12.0 | 12.0 | 12.0 | 5.7 | — |
| Triethylene Glycol | 4.5 | 4.5 | 4.5 | 4.5 | 4.5 |
| 10% PD002W/90% TEG-mBE mixture | 1.5 | 1.5 | 1.5 | 1.5 | 1.5 |
| 2% aqueous EDTA | 1.0 | 1.0 | 1.0 | 1.0 | 1.0 |
| 10% aqueous Proxel | 3.0 | 3.0 | 3.0 | 3.0 | 3.0 |
| 10% aqueous triethanolamine | 0.5 | 0.5 | 0.5 | 0.5 | 0.5 |
| Water | Balance | Balance | Balance | Balance | Balance |

TABLE 2

| | Sample No. | | | | | | | | |
|---|---|---|---|---|---|---|---|---|---|
| | 6 | 7 | 8 | 9 | 10 | 11 | 12 | 13 | 14 |
| C.I. Acid Red 52 | — | 0.09 | 0.16 | 0.17 | 0.24 | 0.28 | 0.96 | — | 0.96 |
| C.I. Acid Red 92 | 0.96 | 0.87 | 0.80 | 0.79 | 0.72 | 0.68 | — | 0.96 | — |
| C.I. Direct Yellow 87 | 4.0 | 4.0 | 4.0 | 4.0 | 4.0 | 4.0 | 4.0 | — | — |
| TEG-mBE | 8.5 | 8.5 | 8.5 | 8.5 | 8.5 | 8.5 | 8.5 | 8.5 | 8.5 |
| Glycerin | 12.0 | 12.0 | 12.0 | 12.0 | 12.0 | 12.0 | 12.0 | 12.0 | 12.0 |
| Triethylene glycol | 4.5 | 4.5 | 4.5 | 4.5 | 4.5 | 4.5 | 4.5 | 4.5 | 4.5 |
| 10% PD002W/90% TEG-mBE mixture | 1.5 | 1.5 | 1.5 | 1.5 | 1.5 | 1.5 | 1.5 | 1.5 | 1.5 |
| 2% aqueous EDTA | 1.0 | 1.0 | 1.0 | 1.0 | 1.0 | 1.0 | 1.0 | 1.0 | 1.0 |
| 10% aqueous Proxel | 3.0 | 3.0 | 3.0 | 3.0 | 3.0 | 3.0 | 3.0 | 3.0 | 3.0 |
| 10% aqueous triethanolamine | 0.5 | 0.5 | 0.5 | 0.5 | 0.5 | 0.5 | 0.5 | 0.5 | 0.5 |
| Water | Balance | Balance | Balance | Balance | Balance | Balance | Balance | Balance | Balance |

TABLE 3

| | Sample No. | | | | | | | | | | | |
|---|---|---|---|---|---|---|---|---|---|---|---|---|
| | 15 | 16 | 17 | 18 | 19 | 20 | 21 | 22 | 23 | 24 | 25 | 26 |
| C.I. Acid Red 52 | 0.09 | 0.09 | 0.09 | 0.09 | 0.09 | 0.09 | 0.09 | 0.09 | 0.09 | 0.09 | 0.09 | 0.09 |
| C.I. Acid Red 92 | 0.87 | 0.87 | 0.87 | 0.87 | 0.87 | 0.87 | 0.87 | 0.87 | 0.87 | 0.87 | 0.87 | 0.87 |
| C.I. Direct Yellow 87 | 4.0 | 4.0 | 4.0 | 4.0 | 4.0 | 4.0 | 4.0 | 4.0 | 4.0 | 4.0 | 4.0 | 4.0 |
| TEG-mBE | — | 5.0 | 8.5 | 11.0 | 15.0 | 20.0 | — | — | — | — | — | — |
| DEG-mBE | — | — | — | — | — | — | 8.5 | 15.0 | 20.0 | — | — | — |
| TEG-mME | — | — | — | — | — | — | — | — | — | 8.5 | 15.0 | 20.0 |
| DEG-miBE | — | — | — | — | — | — | — | — | — | — | — | — |
| DEG-mHeE | — | — | — | — | — | — | — | — | — | — | — | — |
| N1006 | — | — | — | — | — | — | — | — | — | — | — | — |
| N1004 | — | — | — | — | — | — | — | — | — | — | — | — |
| Glycerin | 20.0 | 15.0 | 12.0 | 9.0 | 5.0 | — | 12.0 | 5.0 | — | 12.0 | 5.0 | — |
| Triethylene glycol | 4.5 | 4.5 | 4.5 | 4.5 | 4.5 | 4.5 | 4.5 | 4.5 | 4.5 | 4.5 | 4.5 | 4.5 |
| 10% PD002W/90% TEG-mBE mixture | 1.5 | 1.5 | 1.5 | 1.5 | 1.5 | 1.5 | 1.5 | 1.5 | 1.5 | 1.5 | 1.5 | 1.5 |
| 2% aqueous EDTA | 1.0 | 1.0 | 1.0 | 1.0 | 1.0 | 1.0 | 1.0 | 1.0 | 1.0 | 1.0 | 1.0 | 1.0 |
| 10% aqueous Proxel | — | — | — | — | — | — | — | — | — | — | — | — |
| 10% aqueous triethanolamine | 0.5 | 0.5 | 0.5 | 0.5 | 0.5 | 0.5 | 0.5 | 0.5 | 0.5 | 0.5 | 0.5 | 0.5 |
| Water | Balance | Balance | Balance | Balance | Balance | Balance | Balance | Balance | Balance | Balance | Balance | Balance |

TABLE 4

| | Sample No. | | | | | | | | | | | | |
|---|---|---|---|---|---|---|---|---|---|---|---|---|---|
| | 27 | 28 | 29 | 30 | 31 | 32 | 33 | 34 | 35 | 36 | 37 | 38 | 39 |
| C.I. Acid Red 52 | 0.09 | 0.09 | 0.09 | 0.09 | 0.09 | 0.09 | 0.09 | 0.09 | 0.09 | 0.09 | 0.09 | 0.09 | 0.09 |
| C.I. Acid Red 92 | 0.87 | 0.87 | 0.87 | 0.87 | 0.87 | 0.87 | 0.87 | 0.87 | 0.87 | 0.87 | 0.87 | 0.87 | 0.87 |
| C.I. Direct Yellow 87 | 4.0 | 4.0 | 4.0 | 4.0 | 4.0 | 4.0 | 4.0 | 4.0 | 4.0 | 4.0 | 4.0 | 4.0 | 4.0 |
| TEG-mBE | — | — | — | — | — | — | — | — | — | — | — | — | — |

TABLE 4-continued

| | Sample No. | | | | | | | | | | | | |
|---|---|---|---|---|---|---|---|---|---|---|---|---|---|
| | 27 | 28 | 29 | 30 | 31 | 32 | 33 | 34 | 35 | 36 | 37 | 38 | 39 |
| DEG-mBE | — | — | — | — | — | — | — | — | — | — | — | — | — |
| TEG-mME | — | — | — | — | — | — | — | — | — | — | — | — | — |
| DEG-miBE | 5.0 | 8.5 | — | — | — | — | — | — | — | — | — | — | — |
| DEG-mHeE | — | — | 5.0 | 8.5 | — | — | — | — | — | — | — | — | — |
| N1006 | — | — | — | — | 1.0 | 2.0 | 3.0 | 5.0 | 7.0 | — | — | — | — |
| N1004 | — | — | — | — | — | — | — | — | — | 1.0 | 2.0 | 3.0 | 5.0 |
| Glycerin | 15 | 12 | 15 | 12 | 17.5 | 17.5 | 17.5 | 15.5 | 13.5 | 17.5 | 17.5 | 17.5 | 15.5 |
| Triethylene glycol | 4.5 | 4.5 | 4.5 | 4.5 | 4.5 | 4.5 | 4.5 | 4.5 | 4.5 | 4.5 | 4.5 | 4.5 | 4.5 |
| 10% PD002W/90% TEG-mBE mixture | 1.5 | 1.5 | 1.5 | 1.5 | 1.5 | 1.5 | 1.5 | 1.5 | 1.5 | 1.5 | 1.5 | 1.5 | 1.5 |
| 2% aqueous EDTA | 1.0 | 1.0 | 1.0 | 1.0 | 1.0 | 1.0 | 1.0 | 1.0 | 1.0 | 1.0 | 1.0 | 1.0 | 1.0 |
| 10% aqueous Proxel | — | — | — | — | — | — | — | — | — | — | — | — | — |
| 10% aqueous triethanolamine | 0.5 | 0.5 | 0.5 | 0.5 | 0.5 | 0.5 | 0.5 | 0.5 | 0.5 | 0.5 | 0.5 | 0.5 | 0.5 |
| Water | Balance | Balance | Balance | Balance | Balance | Balance | Balance | Balance | Balance | Balance | Balance | Balance | Balance |

TABLE 5

| | Sample No. | | | | | | | | | | |
|---|---|---|---|---|---|---|---|---|---|---|---|
| | 40 | 41 | 42 | 43 | 44 | 45 | 46 | 47 | 48 | 49 | 50 |
| C.I. Acid Red 52 | 0.09 | 0.09 | 0.09 | 0.09 | 0.09 | 0.09 | 0.09 | 0.09 | 0.09 | 0.09 | 0.09 |
| C.I. Acid Red 92 | 0.87 | 0.87 | 0.87 | 0.87 | 0.87 | 0.87 | 0.87 | 0.87 | 0.87 | 0.87 | 0.87 |
| C.I. Direct Yellow 87 | 4.0 | 4.0 | 4.0 | 4.0 | 4.0 | 4.0 | 4.0 | 4.0 | 4.0 | 4.0 | 4.0 |
| TEG-mBE | — | — | — | 5.0 | 3.0 | 2.0 | — | — | 2.0 | 4.0 | 3.0 |
| DEG-mBE | — | — | — | — | — | — | — | — | — | — | — |
| TEG-mME | — | — | — | — | — | — | — | — | — | — | — |
| DEG-miBE | — | — | — | — | — | — | — | — | — | — | — |
| DEG-mHeE | — | — | — | — | — | — | — | — | — | — | — |
| N1006 | 8.5 | 5.0 | 3.0 | 5.0 | 3.0 | 2.0 | — | — | — | — | — |
| N1004 | — | — | — | — | — | — | 5.0 | 3.0 | 2.0 | 2.0 | 1.0 |
| Glycerin | 12.0 | 12.0 | 12.0 | 12.0 | 12.0 | 12.0 | 12.0 | 12.0 | 12.0 | 12.0 | 12.0 |
| Triethylene glycol | 4.5 | 4.5 | 4.5 | 4.5 | 4.5 | 4.5 | 4.5 | 4.5 | 4.5 | 4.5 | 4.5 |
| 10% PD002W/90% TEG-mBE mixture | 0.15 | 0.15 | 0.15 | 0.15 | 0.15 | 0.15 | 0.15 | 0.15 | 0.15 | 0.15 | 0.15 |
| 2% aqueous EDTA | 1.0 | 1.0 | 1.0 | 1.0 | 1.0 | 1.0 | 1.0 | 1.0 | 1.0 | 1.0 | 1.0 |
| 10% aqueous Proxel | 3.0 | 3.0 | 3.0 | 3.0 | 3.0 | 3.0 | 3.0 | 3.0 | 3.0 | 3.0 | 3.0 |
| 10% aqueous triethanolamine | 0.5 | 0.5 | 0.5 | 0.5 | 0.5 | 0.5 | 0.5 | 0.5 | 0.5 | 0.5 | 0.5 |
| Water | Balance | Balance | Balance | Balance | Balance | Balance | Balance | Balance | Balance | Balance | Balance |

Evaluation Method

Evaluation 1: Measurement of Fluorescence Intensity

A solid pattern was printed at a 100% duty cycle on a DL envelope manufactured by Script with an ink jet printer MJ-8000C provided with an on-demand multi-print head, which applies thermal energy to an ink composition in response to print signals and thereby ejects the ink composition. The fluorescence intensity was measured at a maximum fluorescence wavelength with a fluorometer (F-4500 manufactured by Hitachi, Ltd.) at an excitation wavelength of 365 nm. Table 6 shows the fluorescence intensities of the ink compositions.

Evaluation 2: Measurement of Optical Density (OD)

A solid-printed matter was prepared using the ink compositions with an ink jet printer MJ-8000C (manufactured by Seiko Epson Co.) at a resolution of 360 dpi. After the solid-printed matter was left alone at 24° C. for 24 hours, the OD of a filled-in area was measured with a Gretag densitometer (manufactured by GretagMacbeth). Table 6 shows the ODs of the ink compositions.

Evaluation 3: Stability of Ink Composition

After an ink composition (50 ml) in a sample bottle was left alone at a high temperature (60° C) for 12 hours, the phase separation of the ink composition was evaluated visually in accordance with the following criteria. Table 7 shows the results.

Good: No phase separation
Fair: A slight change in refractive index in an upper portion
Poor: Phase separation

TABLE 6

| | Sample No. | | | | | | | | | | | | |
|---|---|---|---|---|---|---|---|---|---|---|---|---|---|
| | 6 | 2 | 3 | 4 | 5 | 6 | 7 | 8 | 9 | 10 | 11 | 12 | 3 |
| OD | 0.400 | 0.430 | 0.434 | 0.440 | 0.450 | 0.362 | 0.434 | 0.462 | 0.464 | 0.496 | 0.492 | 0.572 | 0.360 |
| Fluorescence intensity | 178.8 | 338.9 | 418.7 | 417.0 | 417.7 | 389.8 | 418.7 | 387.2 | 379.0 | 317.3 | 292.9 | 126.2 | 173.1 |

| | Sample No. | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 | 26 |
| OD | 0.518 | 0.886 | 0.836 | 0.802 | 0.792 | 0.786 | 0.756 | 0.800 | 0.784 | 0.778 | 0.852 | 0.830 | 0.816 |
| Fluorescence intensity | 141.1 | 330.0 | 423.8 | 420.9 | 394.7 | 323.9 | 259.1 | 445.7 | 374.4 | 281.5 | 325.5 | 313.1 | 320.7 |

| | Sample No. | | | | | | | | | | | |
|---|---|---|---|---|---|---|---|---|---|---|---|---|
| | 27 | 28 | 29 | 30 | 31 | 32 | 33 | 34 | 35 | 36 | 37 | 38 | 39 |
| OD | 0.838 | 0.806 | 0.778 | Un-printed | 0.844 | 0.822 | 0.802 | 0.794 | 0.772 | 0.848 | 0.820 | 0.798 | 0.782 |
| Fluorescence intensity | 439.7 | 469.3 | 556.5 | | 492.1 | 531.2 | 533.0 | 514.4 | 498.6 | 502.6 | 568.6 | 581.0 | 593.5 |

TABLE 7

| | Sample No. | | | | | | | | | | |
|---|---|---|---|---|---|---|---|---|---|---|---|
| | 40 | 41 | 42 | 43 | 44 | 45 | 46 | 47 | 48 | 49 | 50 |
| Stability of ink composition | Fair | Fair | Fair | Good | Good | Good | Poor | Fair | Fair | Fair | Good |

What is claimed is:

1. An ink composition comprising C.I. Acid Red 52, C.I. Acid Red 92, C.I. Direct Yellow 87, water, a water-soluble organic solvent, tetraethylene glycol monoethylhexyl ether, and triethylene glycol monobutyl ether.

2. An ink composition comprising C.I. Acid Red 52, C.I. Acid Red 92,C.I. Direct Yellow 87, water, a water-soluble organic solvent, hexaethylene glycol monoethylhexyl ether, and triethylene glycol monobutyl ether.

3. The ink composition according to claim 1, wherein the total content of tetraethylene glycol monoethylhexyl ether and triethylene glycol monobutyl ether ranges from 1% to 6% by weight of the ink composition.

4. The ink composition according to claim 2, wherein the total content of hexaethylene glycol monoethylhexyl ether and triethylene glycol monobutyl ether ranges from 1% to 10% by weight of the ink composition.

5. The ink composition according to claim 1, wherein the content of C.I. Direct Yellow 87 ranges from 3.2% to 4.8% by weight.

6. The ink composition according to claim 1, wherein the content of C.I. Acid Red 52 ranges from 0.05% to 0.20% by weight, and the content of C.I. Acid Red 92 ranges from 0.5% to 1.2% by weight.

7. The ink composition according to claim 1, wherein the weight ratio of C.I. Acid Red 52 to C.I. Acid Red 92 ranges from 1:4 to 1:12.

8. An ink jet printing method for ejecting droplets of an ink composition according to claims 1, further allowing the droplets to adhere to a recording medium to print letters and symbols.

9. An ink jet printing method for ejecting droplets of an ink composition according to claims 2, further allowing the droplets to adhere to a recording medium to print letters and symbols.

10. An ink jet printing method for ejecting droplets of an ink composition according to claims 3, further allowing the droplets to adhere to a recording medium to print letters and symbols.

11. An ink jet printing method for ejecting droplets of an ink composition according to claims 4, further allowing the droplets to adhere to a recording medium to print letters and symbols.

12. An ink jet printing method for ejecting droplets of an ink composition according to claims 5, further allowing the droplets to adhere to a recording medium to print letters and symbols.

13. An ink jet printing method for ejecting droplets of an ink composition according to claims 6, further allowing the droplets to adhere to a recording medium to print letters and symbols.

14. An ink jet printing method for ejecting droplets of an ink composition according to claims 7, further allowing the droplets to adhere to a recording medium to print letters and symbols.

* * * * *